US010002577B2

(12) United States Patent
Liu et al.

(10) Patent No.: US 10,002,577 B2
(45) Date of Patent: Jun. 19, 2018

(54) COLOR ADJUSTMENT METHOD AND DEVICE, LIQUID CRYSTAL DISPLAY (71) Applicant: Xiaomi Inc., Beijing (CN)

(72) Inventors: Anyu Liu, Beijing (CN); Chuanshun Ji, Beijing (CN); Guosheng Li, Beijing (CN)

(73) Assignee: Xiaomi Inc., Beijing (CN)

( * ) Notice: Subject to any disclaimer, the term of this patent is extended or adjusted under 35 U.S.C. 154(b) by 115 days.

(21) Appl. No.: 15/137,750

(22) Filed: Apr. 25, 2016

(65) Prior Publication Data

US 2016/0240152 A1    Aug. 18, 2016

Related U.S. Application Data (63) Continuation of application No. PCT/CN2015/093413, filed on Oct. 30, 2015.

(30) Foreign Application Priority Data

Jan. 5, 2015    (CN) .......................... 2015 1 0004915
Jan. 13, 2015   (CN) .......................... 2015 1 0017054

(51) Int. Cl.
G09G 3/36   (2006.01)
G09G 3/20   (2006.01)
(Continued)

(52) U.S. Cl.
CPC ........... G09G 3/3607 (2013.01); G02B 5/208 (2013.01); G02F 1/133509 (2013.01);
(Continued)

(58) Field of Classification Search
CPC ....... G09G 2340/06; G09G 2320/0673; G09G 2320/0276; G09G 3/2003; G09G 3/3607; G02F 1/133509; G02F 1/133528
See application file for complete search history.

(56) References Cited

U.S. PATENT DOCUMENTS

2006/0254294 A1   11/2006  Shimamoto et al.
2010/0066769 A1*   3/2010  Nose .................... G09G 3/3648
                                                           345/690
(Continued)

FOREIGN PATENT DOCUMENTS

CN    101493532 A    7/2009
CN    102854652 A    1/2013
(Continued)

OTHER PUBLICATIONS

Partial Search Report issued by the European Patent Office dated May 6, 2016, in counterpart European Patent Application No. EP 15203128.2-1904.
(Continued)

Primary Examiner — Yuehan Wang
Assistant Examiner — Michael Le
(74) Attorney, Agent, or Firm — Finnegan, Henderson, Farabow, Garrett & Dunner LLP (57) ABSTRACT A color adjustment method includes obtaining a current color gamut mode of a pixel, converting the current color gamut mode of the pixel to a preset color gamut mode to obtain a blue component of the pixel in the preset color gamut mode, and performing an intensity weakening adjustment on the blue component of the pixel in the preset color gamut mode.

6 Claims, 6 Drawing Sheets (51) Int. Cl.
*G02F 1/1335* (2006.01)
*G02B 5/20* (2006.01)

(52) U.S. Cl.
CPC ..... *G02F 1/133528* (2013.01); *G09G 3/2003* (2013.01); *G02F 2001/133567* (2013.01); *G02F 2201/086* (2013.01); *G09G 2320/0276* (2013.01); *G09G 2320/0666* (2013.01); *G09G 2320/0673* (2013.01); *G09G 2340/06* (2013.01)

(56) References Cited

U.S. PATENT DOCUMENTS

| | | | | |
|---|---|---|---|---|
| 2010/0085361 | A1* | 4/2010 | Kim | G06T 5/008 345/428 |
| 2010/0141859 | A1* | 6/2010 | Park | C09K 19/02 349/39 |
| 2011/0085111 | A1 | 4/2011 | Shibahara | |
| 2011/0267574 | A1 | 11/2011 | Kawahira et al. | |
| 2012/0050563 | A1 | 3/2012 | Cote et al. | |

FOREIGN PATENT DOCUMENTS

| | | |
|---|---|---|
| CN | 203444206 U | 2/2014 |
| CN | 103957345 A | 7/2014 |
| CN | 104614886 A | 5/2015 |
| JP | 2008-083439 | 4/2008 |
| JP | 2010-130562 A | 6/2010 |
| JP | 2014-119642 | 6/2014 |
| KR | 10-2010-0041122 | 4/2010 |
| KR | 10-2010-0064215 A | 6/2010 |
| WO | WO 2014/002324 A1 | 1/2014 |
| WO | WO 2014002324 A1 * | 1/2014 ............... G09G 5/02 |
| WO | WO 2014/203769 A1 | 12/2014 |
| WO | WO 2014/208254 A1 | 12/2014 |

OTHER PUBLICATIONS

European Search Report issued by the European Patent Office dated Jul. 8, 2016, in counterpart European Patent Application No. 15203128.2-1904.
Examination Report issued by the European Patent Office dated Jan. 24, 2017, in counterpart European Patent Application No. 15203128.2-1904.
Notification of Reason for Refusal issued by the Korean Patent Office dated Jan. 19, 2017, in counterpart Korean Patent Application No. 10-2016-7004438.
International Search Report issued by the the State Intellectual Property Office of the P.R.C. (SIPO) dated Jan. 29, 2016, in counterpart International Application No. PCT/CN2015/093413.
First Office Action issued by the SIPO dated Dec. 30, 2016, in counterpart Chinese Patent Application No. 201510017054.3.
Russian Office Action issued by the Russian Patent Office dated Apr. 13, 2017, in counterpart Russian Patent Application No. 2016107720.
Jonathan Cepeda-Negrete et al., "Combining Color Constancy and Gamma Correction for Image Enhancement", 2012 Ninth Electronics, Robotics and Automotive Mechanics Conference, 2012 IEEE.

* cited by examiner

COLOR ADJUSTMENT METHOD AND DEVICE, LIQUID CRYSTAL DISPLAY

CROSS-REFERENCE TO RELATED APPLICATIONS

This application is a continuation of International Application No. PCT/CN2015/093413, filed Oct. 30, 2015, which is based on and claims priority to Chinese Patent Application Serial No. 201510017054.3, filed with the State Intellectual Property Office of P. R. China on Jan. 13, 2015, and Chinese Patent Application Serial No. 201510004915.4, filed with the State Intellectual Property Office of P. R. China on Jan. 5, 2015, the entire contents of all of which are incorporated herein by reference.

FIELD

The present disclosure relates to optical technology and, more particularly to a color adjustment method, a color adjustment device, and a liquid crystal display.

BACKGROUND

A liquid crystal display (LCD) displays images by changing the orientation directions of molecules of liquid crystal material filled between two parallel plates via applied voltages. A light source for LCDs can be white light emitted from a light-emitting diode (LED). The white light consists of light with various wavelengths, including blue light and ultraviolet radiation. However, the blue light and the ultraviolet radiation can cause fatigue or even damage in human eyes.

SUMMARY

In accordance with the present disclosure, there is provided a color adjustment method including obtaining a current color gamut mode of a pixel, converting the current color gamut mode of the pixel to a preset color gamut mode to obtain a blue component of the pixel in the preset color gamut mode, and performing an intensity weakening adjustment on the blue component of the pixel in the preset color gamut mode.

Also in accordance with the present disclosure, there is provided a color adjustment method including obtaining mapping parameters for primary colors of a pixel, mapping the primary colors of the pixel to new primary colors according to the mapping parameters, and displaying an image on a screen according to the new primary colors.

Also in accordance with the present disclosure, there is provided a color adjustment device including a processor and a memory storing instructions. The instructions, when executed by the processor, cause the processor to obtain a current color gamut mode of a pixel, convert the current color gamut mode of the pixel to a preset color gamut mode to obtain a blue component of the pixel in the preset color gamut mode, and perform an intensity weakening regulation on the blue component of the pixel in the preset color gamut mode.

Also in accordance with the present disclosure, there is provided a color adjustment device including a processor and a memory storing instructions. The instructions, when executed by the processor, cause the processor to obtain mapping parameters for primary colors of the pixel, map the primary colors of the pixel to new primary colors according to the mapping parameters, and display an image on a screen according to the new primary colors.

Also in accordance with the present disclosure, there is provided a liquid crystal display including a backlight source, a lower polarizer over the backlight source, and an optical filter over the lower polarizer. The optical filter is configured to filter out ultraviolet radiation or blue component of a pixel of the liquid crystal display, or both the ultraviolet radiation and the blue component of the pixel. The display further includes a liquid crystal layer over the optical filter and an upper polarizer over the liquid crystal layer.

It should be understood that the above general description and following detail description are exemplary and explanatory, and shall not be construed to limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Referring to the following description and drawings, these and other aspects of the embodiments of the present disclosure will be apparent. In the description and drawings, some specific approaches of the embodiments of the present disclosure are provided, so as to show ways to perform the principle of the embodiments of the present disclosure. However, it should be understood that the present disclosure is not limited thereby. Instead, the embodiments of the present disclosure include all the variants, modifications, and their equivalents within the spirit and scope of the present disclosure as defined by the claims.

Blue light is a visible light, and is also the blue channel in the RGB color gamut. Therefore, adjusting the blue light of a liquid crystal display (LCD) can affect the visual experience of a viewer. In contrast, ultraviolet radiation is an invisible light, and can be completely removed without affecting the display effect. According to the present disclosure, the structure of the liquid crystal display is improved to reduce intensities of the ultraviolet radiation and the blue light, thus protecting the viewer's eyes.

A typical LCD structure includes a backlight source in a bottom layer, and a liquid crystal layer sandwiched between two polarizer layers. Liquid crystal molecules in the liquid crystal layer are controlled by applied voltages to rotate between 0 degrees and 90 degrees, thus realizing different light transmission.

Since the ultraviolet radiation has no influence on the display effect, an ultraviolet optical filter can be directly added in the structure of the LCD, to filter out the ultraviolet radiation.

Figure 1:
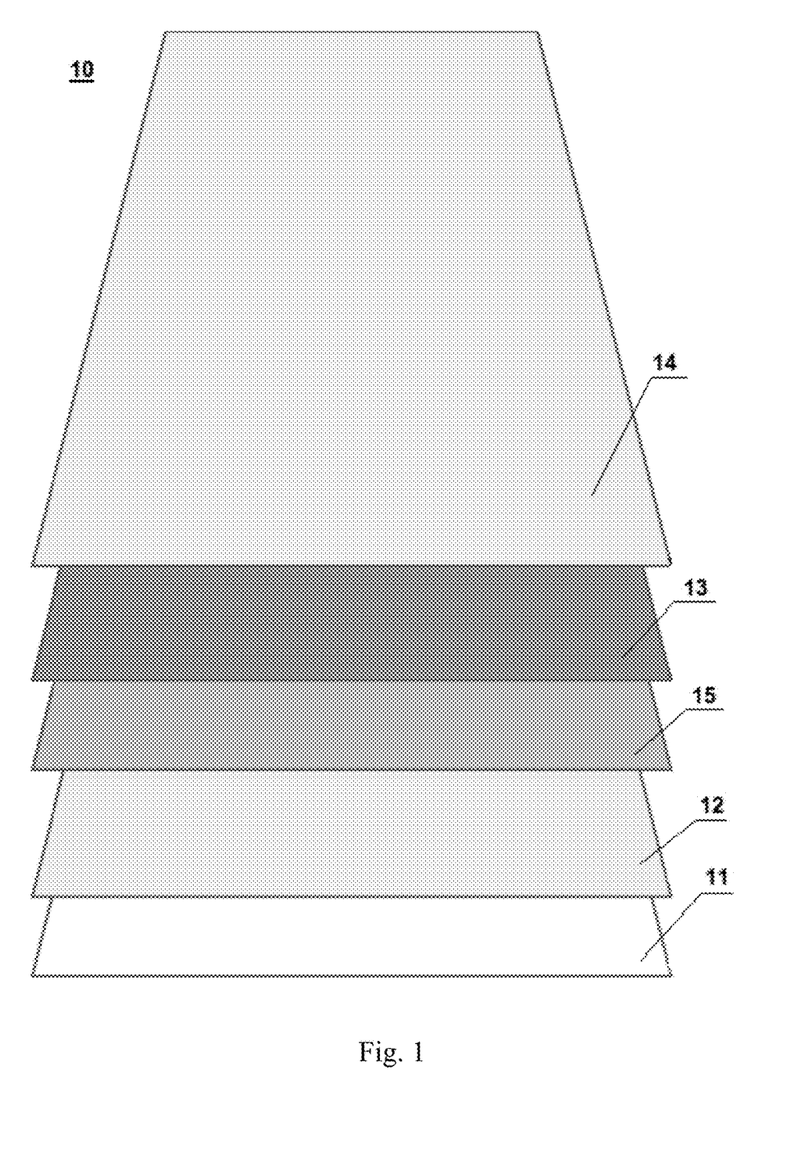
FIG. 1 is a schematic diagram of a liquid crystal display according to an exemplary embodiment.

FIG. 1 is a schematic diagram of a pixel 10 in a liquid crystal display according to an exemplary embodiment. As shown in FIG. 1, the pixel 10 includes a lower polarizer 12, a liquid crystal layer 13, and an upper polarizer 14, all of which are arranged over a backlight source 11. The liquid crystal layer 13 is located between the lower polarizer 12 and the upper polarizer 14. The pixel 10 further includes an optical filter 15 located between the liquid crystal layer 13 and the lower polarizer 12. The optical filter 15 is configured to filter out the ultraviolet radiation, the blue component of light for the pixel 10, also referred to as the blue component of the pixel 10, or both the ultraviolet radiation and the blue component of the pixel 10.

Thus, according to the present disclosure, the ultraviolet radiation and/or the blue component of the pixel 10 can be weakened by using the optical filter 15.

As described above, the optical filter 15 is added to the pixel 10. Therefore, the thickness of the liquid crystal display containing a plurality of the pixel 10 is increased. In some embodiments, by modifying the manufacturing process, the optical filter 15 can be integrated into the lower polarizer 12, i.e., the lower polarizer 12 can be configured to realize both the polarizing function and the filtering function.

According to the present disclosure, the blue component of the pixel 10 can also be reduced via color conversion, such as a color adjustment via software.

The exemplary methods and devices described below are directed to one pixel. However, methods and devices consistent with the present disclosure can be applied to process any or all of the pixels in a liquid crystal display.

Figure 2:
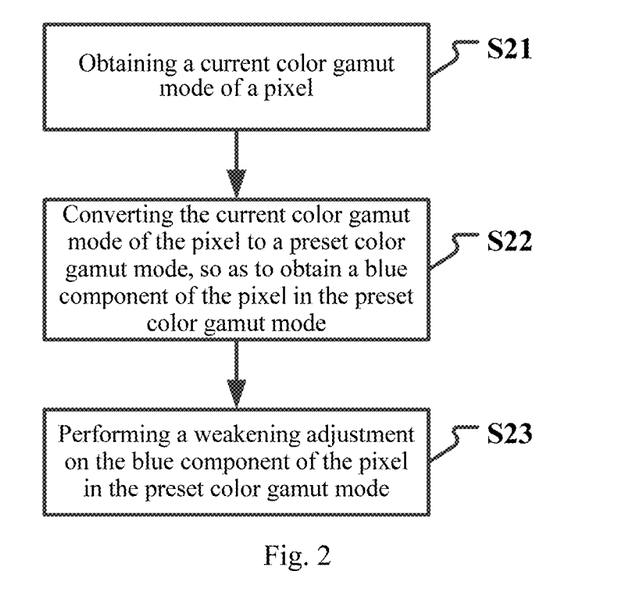
FIG. 2 is a flow chart of a color adjustment method according to an exemplary embodiment.

FIG. 2 is a flow chart of a color adjustment method according to an exemplary embodiment. The color adjustment method shown in FIG. 2 can be used in a terminal. As shown in FIG. 2, at S21, a current color gamut mode of a pixel of an liquid crystal display is obtained. At S22, the current color gamut mode of the pixel is converted to a preset color gamut mode, so as to obtain a blue component of the pixel in the preset color gamut mode. At S23, a weakening adjustment is performed on the blue component of the pixel in the preset color gamut mode.

For example, in an image rendering process, a color gamut of a pixel needs to be converted from a linear Red Green Blue (RGB) color gamut mode to a standard RGB (sRGB) color gamut mode. A non-linear (GAMMA) correction can be performed on each color channel in the linear RGB color gamut mode, and the corrected blue component can then be weakened.

According to the present disclosure, the blue light can be weakened by the above color adjustment method. In addition, the function of adjusting screen colors can be turned on or off by the user as needed, to enhance the flexibility and convenience of use.

In some embodiments, converting the current color gamut mode to the preset color gamut mode (S22 in FIG. 2) includes performing a non-linear correction on the blue component of the pixel according to preset formulas described below, to obtain the blue component of the pixel in the preset color gamut mode. The preset formulas include:

if $C_{lB}$ is greater than a first preset value, $C_{sB}=(1+a)\cdot C_{lB}^{1/x}$; and if $C_{lB}$ is less than or equal to the first preset value, $C_{sB}=b\cdot C_{lB}$;

where, $C_{lB}$ is the normalized intensity of the blue component of the pixel in the current color gamut mode, $0 \leq C_{lB} \leq 1$; $C_{sB}$ is the normalized intensity of the blue component of the pixel in the preset color gamut mode, $0 \leq C_{sB} \leq 1$; a is a first preset non-linear correction weight, b is a second preset non-linear correction weight; and x is a first gamma value of the non-linear correction. In some embodiments, when the calculation using the above formulae results in a $C_{sB}$ value larger than 1, i.e., the calculated $C_{sB}$ value exceeds the above range of $C_{sB}$, the value of $C_{sB}$ can be set to 1.

For example, a range of the blue component in the linear RGB color gamut mode is [0, 1]. Assuming the first preset value is 0.00304, a=0.055, and b=12.92, a GAMMA 2.2 correction, i.e., x=2.2, is performed on the blue component of the pixel in the linear RGB color gamut mode as follows:

if $C_{lB}>0.00304$, $C_{sB}=(1+0.055)\cdot C_{lB}^{1/2.2}$; and if $C_{lB} \leq 0.00304$, $C_{sB}=12.92\cdot C_{lB}$;

where the range of $C_{sB}$ after the GAMMA 2.2 correction is [0, 1].

In some embodiments, weakening the blue component, i.e., S23 in FIG. 2, includes, adjusting the first preset non-linear correction weight a to about zero. For example, when the user turns on an eye protection mode, a special treatment is performed on the blue channel, and the first preset non-linear correction weight a is set to about zero (a≈0). As a result, the blue component is weakened, i.e., the blue component in the preset color gamut mode under the eye protection mode is smaller than the blue component in the preset color gamut mode without the eye protection mode, and thus the blue light is weakened.

In some embodiments, the color adjustment method further includes performing a non-linear correction on the red component and the green component of the pixel, respectively, in the current color gamut mode according to preset formulas described below, so as to obtain the red component and the green component of the pixel in the preset color gamut mode. The preset formulas for correcting the red or green component include:

if $C_{lRG}$ is greater than the first preset value, $C_{sRG}=(1+a')\cdot C_{lRG}^{1/y}$; and if $C_{lRG}$ is less than or equal to the first preset value, $C_{sRG}=b'\cdot C_{lRG}$;

where, $C_{lRG}$ is the normalized intensity of the red component or green component of the pixel in the current color gamut mode, $0 \leq C_{lRG} \leq 1$; $C_{sRG}$ is the normalized intensity of the red component or green component of the pixel in the preset color gamut mode, $0 \leq C_{sRG} \leq 1$; a' is a third preset non-linear correction weight, b' is a fourth preset non-linear correction weight; y is a second gamma value of the non-linear correction, and y<x.

Figure 3:
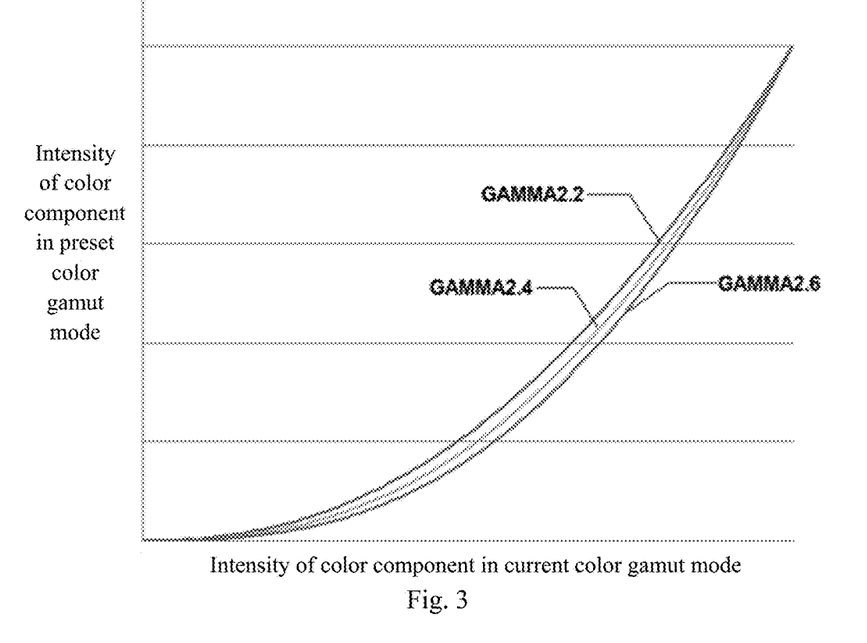
FIG. 3 shows a GAMMA correction curve according to an exemplary embodiment.

For example, the GAMMA 2.2 correction can be performed on the red component and the green component only, and a GAMMA 2.4 correction or a GAMMA 2.6 correction is separately performed on the blue component. FIG. 3 shows the GAMMA correction curves when different GAMMA corrections are applied according to an exemplary embodiment. In FIG. 3, the x axis represents the normalized intensity of a color component in the current color gamut mode and y axis represents the normalized intensity of the color component in the preset color gamut mode. As shown in FIG. 3, by performing different GAMMA corrections on the red component, the green component, and the blue component, the blue light can be weakened.

In examples discussed above, the blue light is reduced by weakening the B color channel in the RGB color coordinate. In the RGB color coordinate, the color of the pixel is formed by mixing three primary colors R (Red), G (Green), and B (Blue) in various proportions. Alternatively, color mixing can be realized by using different primary colors such as C (Cyan), M (Magenta), and Y (Yellow). In the CMY color coordinate, no blue color is used. Therefore, damage to the viewer's eyes by the blue light can be avoided.

Figure 4:
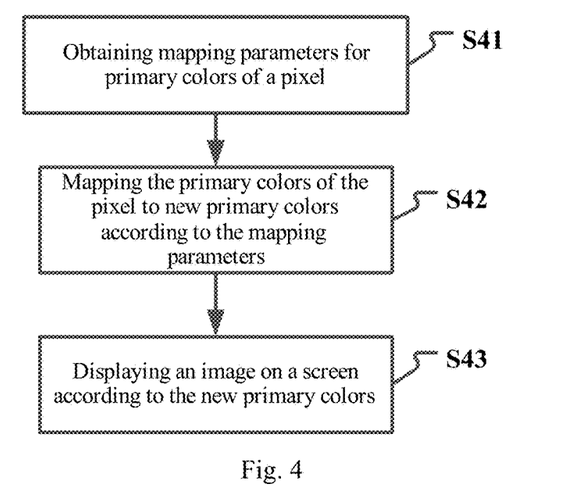
FIG. 4 is a flow chart of a color adjustment method according to another exemplary embodiment.

FIG. 4 is a flow chart of a color adjustment method according to another exemplary embodiment. As shown in FIG. 4, at S41, mapping parameters for primary colors of a pixel of a liquid crystal display are obtained. At S42, current primary colors of the pixel are mapped to new primary colors according to the mapping parameters. At S43, an image is displayed on a screen according to the new primary colors.

For example, the primary colors of the pixel can be mapped according to the following formula:

$$\begin{bmatrix} Y \\ M \\ C \end{bmatrix} = \begin{bmatrix} 0.5 & 0.5 & 0 \\ 0.5 & 0 & 0.5 \\ 0 & 0.5 & 0.5 \end{bmatrix} * \begin{bmatrix} R \\ G \\ B \end{bmatrix}.$$

Therefore, the blue light is reduced by performing the adjustment on the primary colors of the pixel.

Figure 5:
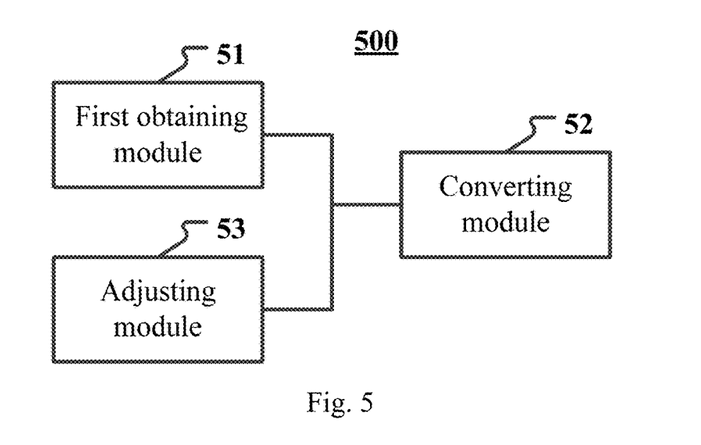
FIG. 5 is a block diagram of a color adjustment device according to an exemplary embodiment.

FIG. 5 is a block diagram of a color adjustment device 500 according to an exemplary embodiment. As shown in FIG. 5, the color adjustment device 500 includes a first obtaining module 51, a converting module 52, and an adjusting module 53. The first obtaining module 51 is configured to obtain a current color gamut mode of a pixel. The converting module 52 is configured to convert the current color gamut mode of the pixel to a preset color gamut mode, so as to obtain a blue component of the pixel in the preset color gamut mode. The adjusting module 53 is configured to perform a weakening adjustment on the blue component of the pixel in the preset color gamut mode.

Figure 6:
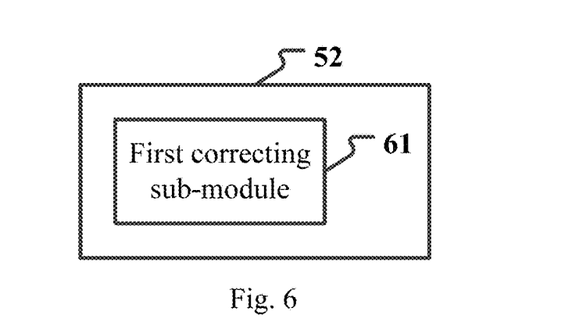
FIG. 6 is a block diagram of a converting module according to an exemplary embodiment.

FIG. 6 is a block diagram of the converting module 52 according to an exemplary embodiment. As shown in FIG. 6, the converting module 52 includes a first correcting sub-module 61. The first correcting sub-module 61 is configured to perform a non-linear correction on the blue component of the pixel in the current color gamut mode according to preset formulas, so as to obtain the blue component of the pixel in the preset color gamut mode. The preset formulas are as described above and include:

if $C_{sB}$ is greater than the first preset value, $C_{sB}=(1+a) \cdot C_{IB}^{1/x}$; and if $C_{sB}$ is less than or equal to the first preset value, $C_{sB}=b \cdot C_{IB}$;

where, $C_{IB}$ is the normalized intensity of the blue component of the pixel in the current color gamut mode, $0 \leq C_{IB} \leq 1$; $C_{sB}$ is the normalized intensity of the blue component of the pixel in the preset color gamut mode, $0 \leq C_{sB} \leq 1$; a is the first preset non-linear correction weight, b is the second preset non-linear correction weight; and x is the first gamma value of the non-linear correction.

In some embodiments, the adjusting module 53 is further configured to adjust the first preset non-linear correction weight a to about zero, if the blue component $C_{sB}$ of the pixel in the preset color gamut mode is greater than the first preset value.

Figure 7:
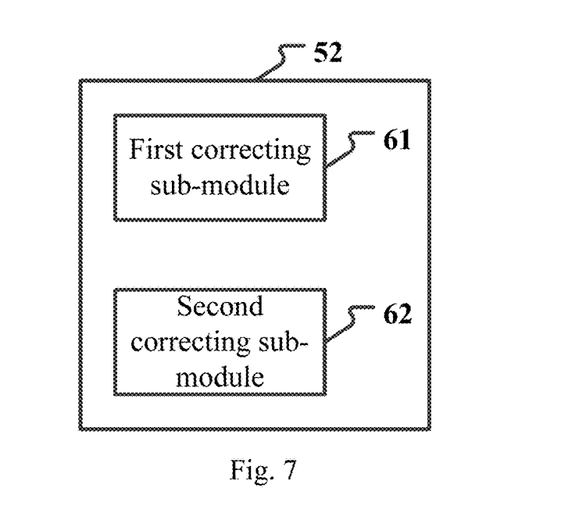
FIG. 7 is a block diagram of a converting module according to another exemplary embodiment.

FIG. 7 is a block diagram of a converting module 52 according to another exemplary embodiment. As shown in FIG. 7, the converting module 52 further includes a second correcting sub-module 62. The second correcting sub-module 62 is configured to perform a non-linear correction respectively on a red component and a green component of the pixel in the current color gamut mode according to preset formulas, so as to obtain the red component and the green component of the pixel in the preset color gamut mode. The preset formulas for correcting the red or green component are as described above and include:

if $C_{sRG}$ is greater than the first preset value, $C_{sRG}=(1+a') \cdot C_{IRG}^{1/y}$; and if $C_{sRG}$ is less than or equal to the first preset value, $C_{sRG}=b' \cdot C_{IRG}$;

where, $C_{IRG}$ is the normalized intensity of the red component or green component of the pixel in the current color gamut mode, $0 \leq C_{IRG} \leq 1$; $C_{sRG}$ is the normalized intensity of the red component or green component of the pixel in the preset color gamut mode, $0 \leq C_{sRG} \leq 1$; a' is the third preset non-linear correction weight, b' is the fourth preset non-linear correction weight; y is the second gamma value of the non-linear correction, and y<x.

Figure 8:
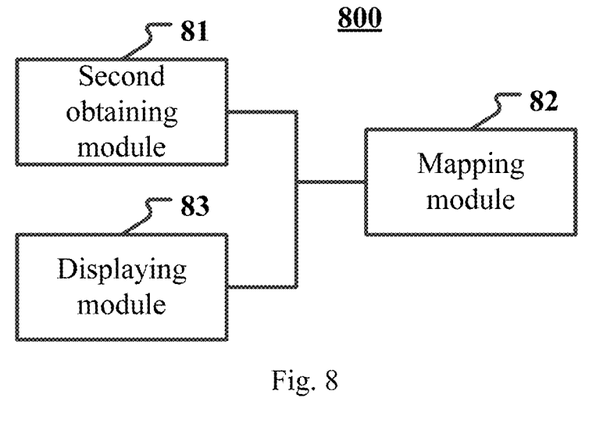
FIG. 8 is a block diagram of a color adjustment device according to another exemplary embodiment.

FIG. 8 is a block diagram of a color adjustment device 800 according to another exemplary embodiment. As shown in FIG. 8, the color adjustment device 800 includes a second obtaining module 81, a mapping module 82, and a displaying module 83. The second obtaining module 81 is configured to obtain mapping parameters for primary colors of a pixel. The mapping module 82 is configured to map current primary colors of the pixel to new primary colors according to the mapping parameters. The displaying module 83 is configured to display an image on a screen according to the new primary colors.

Operations of individual modules in the above devices are similar to those described above with respect to methods consistent with the present disclosure, so that their detailed description is omitted here.

In accordance with the present disclosure, there is also provided a color adjustment device including a processor and a memory storing instructions executable by the processor. The processor is configured to perform methods consistent with embodiments of the present disclosure, such as one or more of those described above.

Figure 9:
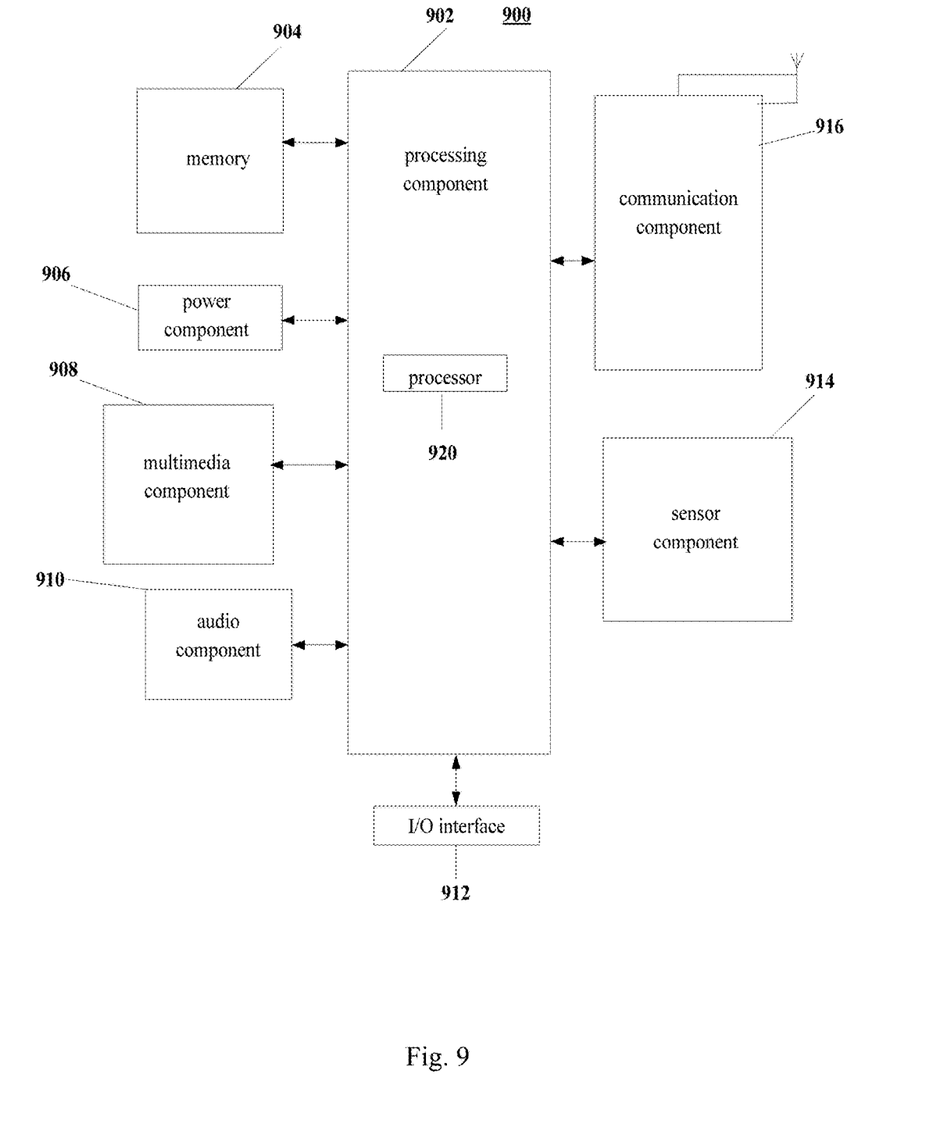
FIG. 9 is a block diagram of a device for color adjustment according to an exemplary embodiment.

FIG. 9 is a block diagram of a device 900 for color adjustment according to another exemplary embodiment. For example, the device 900 may be a mobile phone, a computer, a digital broadcasting terminal, a messaging device, a game console, a tablet device, a fitness equipment, a Personal Digital Assistant PDA, etc.

Referring to FIG. 9, the device 900 includes one or more of the following components: a processing component 902, a memory 904, a power component 906, a multimedia component 908, an audio component 910, an Input/Output (I/O) interface 912, a sensor component 914, and a communication component 916.

The processing component 902 typically controls overall operations of the device 900, such as the operations associated with display, telephone calls, data communications, camera operations, and recording operations. The processing component 902 may comprise one or more processors 920 to execute instructions to perform all or part of the steps in the above described methods. Moreover, the processing component 902 may comprise one or more modules which facilitate the interaction between the processing component 902 and other components. For instance, the processing component 902 may comprise a multimedia module to facilitate the interaction between the multimedia component 908 and the processing component 902.

The memory 904 is configured to store various types of data to support the operation of the device 900. Examples of such data comprise instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may comprise a power management system, one or more power sources, and any other components associated with the generation, management, and distribution of power in the device 900.

The multimedia component 908 comprises a screen providing an output interface between the color adjustment device 900 and the user. In some embodiments, the screen may comprise a liquid crystal display (LCD) and a touch panel. If the screen comprises the touch panel, the screen may be implemented as a touch screen to receive input signals from the user. The touch panel comprises one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 908 comprises a front camera and/or a rear camera. The front camera and the rear camera may receive external multimedia data while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 comprises a microphone configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further comprises a speaker to output audio signals.

The I/O interface 912 provides an interface for the processing component 902 and peripheral interface modules, such as a keyboard, a click wheel, buttons, and the like. The buttons may comprise, but are not limited to, a home button, a volume button, a starting button, and a locking button.

The sensor component 914 comprises one or more sensors to provide status assessments of various aspects of the color adjustment device 900. For instance, the sensor component 914 may detect an open/closed status of the device 900 and relative positioning of components (e.g. the display and the keypad of the device 900). The sensor component 914 may also detect a change in position of the device 900 or of a component in the device 900, a presence or absence of user contact with the device 900, an orientation or an acceleration/deceleration of the color adjustment device 900, and a change in temperature of the device 900. The sensor component 914 may comprise a proximity sensor configured to detect the presence of nearby objects without any physical contact. The sensor component 914 may also comprise a light sensor, such as a CMOS or CCD image sensor, for use in imaging applications. In some embodiments, the sensor component 914 may also comprise an accelerometer sensor, a gyroscope sensor, a magnetic sensor, a pressure sensor, or a temperature sensor.

The communication component 916 is configured to facilitate wired or wireless communication between the device 900 and other devices. The device 900 can access a wireless network based on a communication standard, such as WIFI, 2G, 3G, or 4G, or a combination thereof. In one exemplary embodiment, the communication component 916 receives a broadcast signal or broadcast associated information from an external broadcast management system via a broadcast channel. In one exemplary embodiment, the communication component 916 further comprises a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In example embodiments, there is also provided a non-transitory computer readable storage medium storing instructions, such as the memory 904 storing instructions. The instructions are executable by the processor 920 in the device 900, for performing the methods consistent with embodiments of the present disclosure. For example, the non-transitory computer-readable storage medium may be a ROM, a RAM, a CD-ROM, a magnetic tape, a floppy disc, an optical data storage device, or the like.

A non-transitory computer readable storage medium stores instructions that, when executed by a processor of a mobile terminal, cause the mobile terminal to perform a method consistent with the present disclosure.

Other embodiments of the invention will be apparent to those skilled in the art from consideration of the specification and practice of the invention disclosed here. This application is intended to cover any variations, uses, or adaptations of the invention following the general principles thereof and comprising such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A color adjustment method, comprising:
   obtaining, by a processor, a current color gamut mode of a pixel;
   converting, by the processor, the current color gamut mode of the pixel to a preset color gamut mode, to obtain a blue component of the pixel in the preset color gamut mode; and performing, by the processor, an intensity weakening adjustment on the blue component of the pixel in the preset color gamut mode,
wherein the converting comprises:
performing a non-linear correction on the blue component of the pixel in the current color gamut mode according to preset formulas, to obtain the blue component of the pixel in the preset color gamut mode, the preset formulas including:
if $C_{IB}$ is greater than a first preset value, $C_{sB}=(1+a)\cdot C_{IB}^{1/x}$; and
if $C_{IB}$ is less than or equal to the first preset value, $C_{sB}=b\cdot C_{IB}$;
where:
$C_{IB}$ represents a normalized intensity of the blue component of the pixel in the current color gamut mode, $0 \leq C_{IB} \leq 1$;
$C_{sB}$ represents a normalized intensity of the blue component of the pixel in the preset color gamut mode, $0 \leq C_{sB} \leq 1$;
a is a first preset non-linear correction weight, b is a second preset non-linear correction weight; and
x is a gamma value of the non-linear correction.

2. The color adjustment method according to claim 1, wherein, performing the weakening adjustment on the blue component of the pixel in the preset color gamut mode includes:
adjusting the first preset non-linear correction weight a to about zero.

3. The color adjustment method according to claim 1, wherein the non-linear correction is a first non-linear correction, the preset formulas are first preset formulas, and the gamma value is a first gamma value,
the method further comprising:
performing a second non-linear correction on a red component and a green component, respectively, of the pixel in the current color gamut mode according to second preset formulas, to obtain the red component and the green component of the pixel in the preset color gamut mode, the second preset formulas including:
if $C_{IRG}$ is greater than the first preset value, $C_{sRG}=(1+a')\cdot C_{IRG}^{1/y}$; and
if $C_{IRG}$ is less than or equal to the first preset value, $C_{sRG}=b'\cdot C_{IRG}$;
where:
$C_{IRG}$ represents a normalized intensity of the red component or green component of the pixel in the current color gamut mode, $0 \leq C_{IRG} \leq 1$;
$C_{sRG}$ represents a normalized intensity of the red component or green component of the pixel in the preset color gamut mode, $0 \leq C_{sRG} \leq 1$;
a' is a third preset non-linear correction weight, b' is a fourth preset non-linear correction weight; and
y is a second gamma value of the non-linear correction, $y < x$.

4. A color adjustment device, comprising:
a processor; and
a memory storing instructions that, when executed by the processor, cause the processor to:
obtain a current color gamut mode of a pixel;
convert the current color gamut mode of the pixel to a preset color gamut mode, to obtain a blue component of the pixel in the preset color gamut mode; and
perform an intensity weakening regulation on the blue component of the pixel in the preset color gamut mode;
wherein, in converting the current color gamut mode, the instructions cause the processor to perform a non-linear correction on the blue component of the pixel in the current color gamut mode according to preset formulas, to obtain the blue component of the pixel in the preset color gamut mode, the preset formulas including:
if $C_{IB}$ is greater than a first preset value, $C_{sB}=(1+a)\cdot C_{IB}^{1/x}$; and
if $C_{IB}$ is less than or equal to the first preset value, $C_{sB}=b\cdot C_{IB}$;
where:
$C_{IB}$ represents a normalized intensity of the blue component of the pixel in the current color gamut mode, $0 \leq C_{IB} \leq 1$;
$C_{sB}$ represents a normalized intensity of the blue component of the pixel in the preset color gamut mode, $0 \leq C_{sB} \leq 1$;
a is a first preset non-linear correction weight, b is a second preset non-linear correction weight; and
x is a gamma value of the non-linear correction.

5. The color adjustment device according to claim 4, wherein the instructions further cause the processor to:
adjust the first preset non-linear correction weight a to about zero.

6. The color adjustment device according to claim 4, wherein:
the non-linear correction is a first non-linear correction, the preset formulas are first preset formulas, and the gamma value is a first gamma value, and
the instructions further cause the processor to:
perform a second non-linear correction on a red component and a green component, respectively, of the pixel in the current color gamut mode according to second preset formulas, to obtain the red component and the green component of the pixel in the preset color gamut mode, the second preset formulas including:
if $C_{IRG}$ is greater than the first preset value, $C_{sRG}=(1+a')\cdot C_{IRG}^{1/y}$; and
if $C_{sRG}$ $C_{IRG}$ is less than or equal to the first preset value $C_{sRG}=b'\cdot C_{IRG}$;
where:
$C_{IRG}$ represents a normalized intensity of the red component or green component of the pixel in the current color gamut mode, $0 \leq C_{IRG} \leq 1$;
$C_{sRG}$ represents a normalized intensity of the red component or green component of the pixel in the preset color gamut mode, $0 \leq C_{sRG} \leq 1$;
a' is a third preset non-linear correction weight, b' is a fourth preset non-linear correction weight; and
y is a second gamma value of the non-linear correction, $y < x$.

* * * * *